Figure 1:
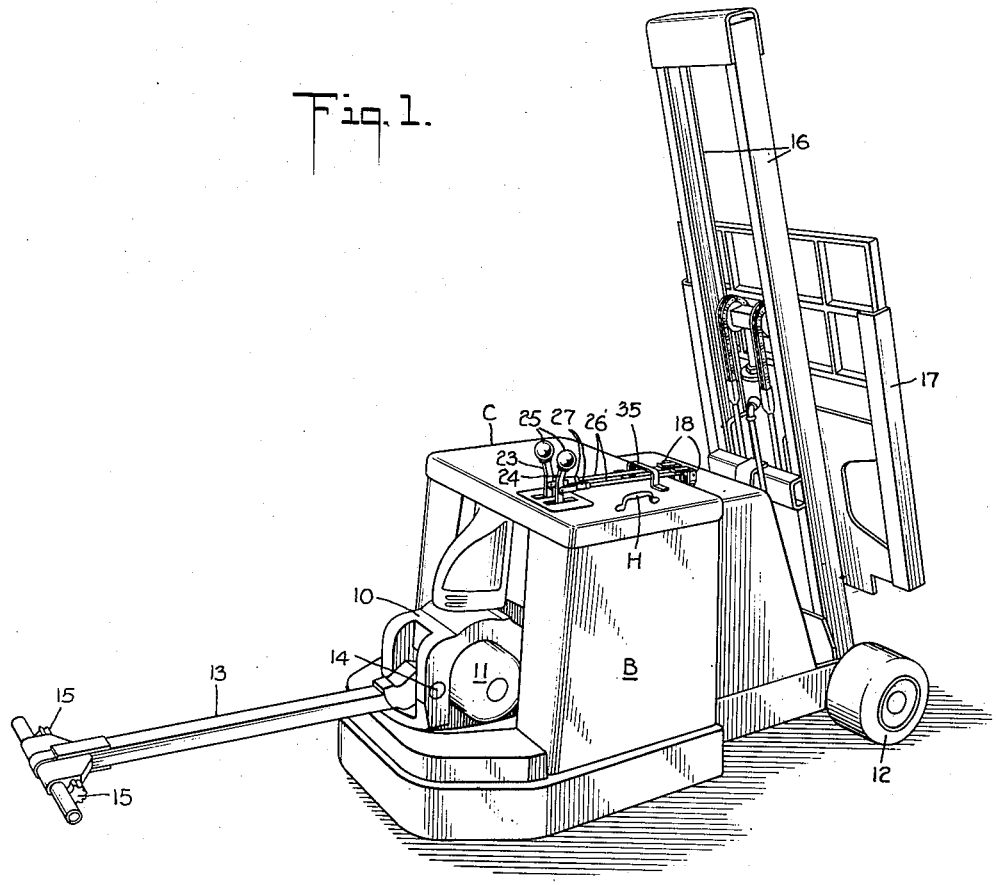

July 29, 1952      C. S. SCHROEDER      2,605,008
CONTROL FOR MOTORIZED TRUCKS

Filed July 19, 1948      2 SHEETS—SHEET 1

INVENTOR
C. S. Schroeder
BY
J. H. Golden
ATTORNEY

July 29, 1952     C. S. SCHROEDER     2,605,008
CONTROL FOR MOTORIZED TRUCKS
Filed July 19, 1948     2 SHEETS—SHEET 2
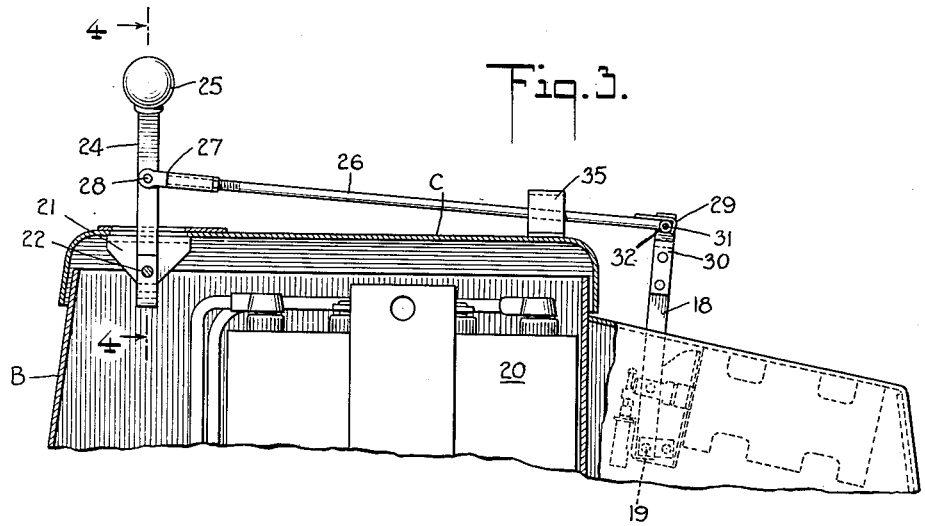
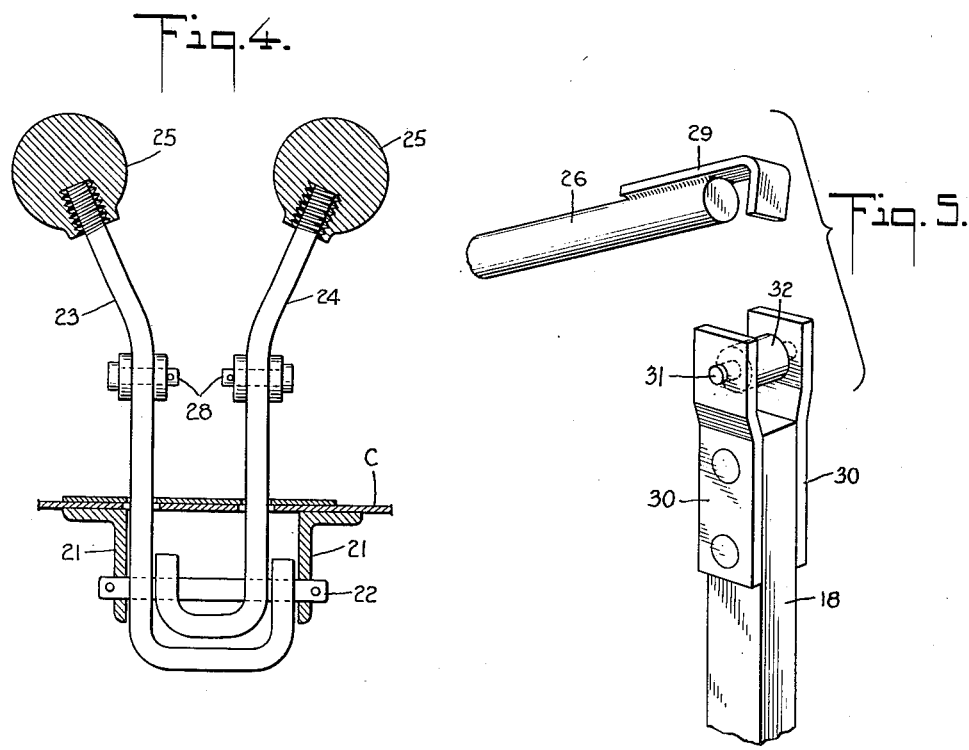
INVENTOR
C. S. Schroeder
BY A. H. Golden
ATTORNEY Patented July 29, 1952

2,605,008

UNITED STATES PATENT OFFICE 2,605,008

CONTROL FOR MOTORIZED TRUCKS

Charles S. Schroeder, Philadelphia, Pa., assignor to The Yale & Towne Manufacturing Company, Stamford, Conn., a corporation of Connecticut Application July 19, 1948, Serial No. 39,449

7 Claims. (Cl. 214—113)

This invention relates to an industrial truck of the motorized hand type. In trucks of the particular class the operator manipulates and controls the truck through a steering handle at the forward end of the truck. A suitable traction motor propels the truck and the operator has available at the end of the steering handle the control buttons whereby the traction motor is stopped or is energized to move the truck forwardly and rearwardly.

Trucks of the particular class are generally equipped with load lifting and lowering mechanism, and also with load tilting apparatus. A considerable problem has arisen in the designing of the control levers and handles that become necessary for the control of the load lifting, lowering, and tilting mechanism. Further, because of the small size of the usual truck of the class described, it is difficult to find sufficient room on the truck for the mounting of the control mechanism, and it is also difficult to mount the said mechanism so that it may be readily accessible to the operator of the truck without requiring his moving considerable distances from the steering handle at the forward end of the truck to other locations on the truck.

It is the object of my invention to contribute readily accessible and easily manipulated control handles for controlling the movement of the load in a truck of the class described.

I have conceived and reduced to practice an arrangement whereby the control handles are mounted on the cover for the battery containing compartment, this battery containing compartment in a truck of the class described being mounted just rearwardly of the steering handle. Because the battery compartment cover in a truck of the class described must be moved frequently from covering position, I arrange for a readily releasable connection between the handles mounted on the cover, and control levers or the like mounted at one side of the battery containing compartment. As a still further feature of this part of the invention, the means of connection between the control handles and the levers are arranged so that the mere movement of the cover out of covering relation to the battery containing compartment will bring about a separation of the parts so as to free the handles for movement with the cover at all times.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
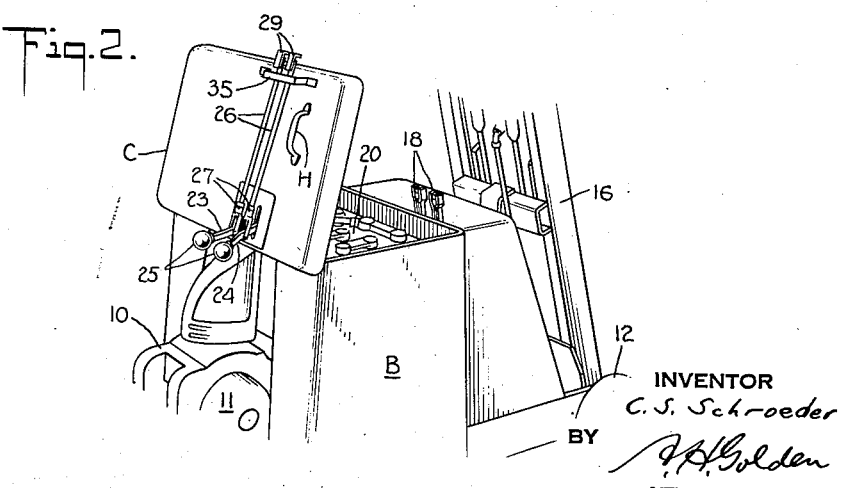

Referring now to the drawings, Fig. 1 is a perspective view of a truck embodying my invention. Fig. 2 shows the battery compartment of the truck with the cover removed therefrom, exposing the battery within the compartment. Fig. 3 is a vertical section through the battery containing compartment showing one control handle and a control lever. Fig. 4 is a section taken along lines 4—4 of Fig. 3, while Fig. 5 is a perspective view showing the yieldable connection between a control lever and a rod used as the means of connection between the control lever and the control handle.

Referring now more particularly to the drawings, the truck of my invention is of that motorized type well known in the art equipped with a steering head 10 containing a motor 11 that drives a traction wheel mounted under the steering head 10 and not, therefore, exposed to view in Fig. 1. The truck also has rear load carrying wheels 12, and on the said wheels 12 and the forward traction wheel the truck is moved to any particular location under the control of a steering handle 13 pivoted to the steering head 10 at 14. The steering handle 13 has suitable switch buttons 15 that may be manipulated by an operator to control the operation of the motor 11, as is well understood by those skilled in the art.

The truck of my invention has a suitable pair of uprights 16 on which is mounted a load carriage 17. Suitable power mechanism such as is well known in the truck art is found on the truck and is utilized for lifting the carriage 17 on the uprights 16 and also for tilting the uprights 16 bodily relatively to the truck. The tilting and lifting is accomplished by power means and these power means are controlled by a pair of levers 18. For the purpose of understanding the construction of this invention, it is merely necessary to know that the levers 18 are mounted as shown best in Fig. 3 for movement about a pivot shaft 19, the power means and the control thereof being conventional. Were it not for my invention to be described below, some suitable handle or other means would be applied to each of the levers 18, and the operator would merely operate these handles to move the levers as necessary. Obviously, the levers can only be reached by the operator if he moves to the side of the truck and such movement takes time and is many times quite inconvenient.

As is quite clearly apparent from the drawings, the battery containing compartment B occupies a position between the levers 18 and the forward end of the truck where the operator normally stands when the truck is brought to a stop for the manipulation of the load. My invention makes it unnecessary for the operator to walk from this position in front of the truck to any other position relatively to the truck.

Battery compartment cover C, as is best shown in Fig. 2, is movable from covering position to uncovering position, thereby exposing a battery 20 within the battery compartment B. As best shown in Fig. 4, the cover C is equipped with brackets 21 carrying a shaft 22 and pivoted on the shaft 22 is a first handle 23 and a second handle 24, each handle having thereon a knob 25. Adjustable rods 26, each equipped with a turn buckle 27 at one end thereof, are pivoted at 28 to each of the two handles 23, 24. At its other end, each rod 26 has welded thereto a spring-like clip 29. Each of the control levers 18 is formed with a pair of side plates 30 extending upwardly beyond the levers 18 and supporting on a short shaft 31 a roller 32. As is quite apparent from Figs. 3 and 5, the particular rod 26 there shown will, with its clip 29, readily move into assembled relation to a roller 32. Thereafter, any movement of the handles 23 and 24 by knob 25 will effect movement of the rods 26 and pivotal movement of the levers 18. Through the particular arrangement, the operator can readily manipulate the levers 18 at any time while standing at the forward end of the truck.

When it is desired to service the battery, the handle H welded to the cover C is used for swinging the cover C upwardly from its position of Fig. 1 to its position of Fig. 2. This movement of the cover will automatically effect separation of the clips 29 from the rollers 32 so as to release rods 26. Rods 26 will then move upwardly with the cover. When the cover is moved back from the position of Fig. 2 toward the position of Fig. 1, a bracket 35 that is welded to the cover C in overlying relation to the two rods 26 will bring the rods 26 back to the position of Figs. 1 and 3 and into assembled relation to the rollers 32.

Those skilled in the art will now understand that through the very simple means of my invention, it is possible to control the levers 18 from the forward end of the truck and yet not prevent the ready servicing of the battery 20 within the battery containing compartment B. In other words, I have merely utilized a part of the truck already available, in order to obtain a further important control feature, while yet not interfering in any way with the normal operation of the parts of the truck as required for servicing and for the proper functioning thereof.

I believe that the considerable contribution I have made to the art will now be understood by those skilled in that art.

I now claim:

1. In a truck of the class described, a forward battery containing compartment, a cover for said battery containing compartment movable into and out of covering position, a control member for a part of said truck positioned rearwardly of said battery containing compartment, a manually operated handle, means mounting said handle on said cover for movement relatively to said cover and for movement bodily with said cover when said cover is removed from covering position relatively to said compartment, means of connection extending between said handle and said control member whereby movement of said handle imparts movement to said control member, and means whereby said means of connection are readily releasable from connecting relation between said control member and handle whereby said handle moves with said cover freely of said control member when said cover is moved out of covering position.

2. In a truck of the class described, a forward battery containing compartment, a cover for said battery containing compartment movable into and out of covering position, a control member for a part of said truck positioned at one side and outwardly of said battery containing compartment, a manually operated handle, means mounting said handle on said cover for movement relatively to said cover and for movement bodily with said cover when said cover is removed from covering position relatively to said compartment, means of connection extending between said handle and said control member whereby movement of said handle imparts movement to said control member, and means whereby said means of connection are readily releasable from connecting relation between said control member and handle whereby said handle moves with said cover freely of said control member when said cover is moved out of covering position.

3. In a truck of the class described, a forward battery containing compartment, a cover for said battery containing compartment pivoted on said compartment for movement into and out of covering position, a control member for a part of said truck positioned rearwardly and outwardly of said battery containing compartment, a manually operated handle, means mounting said handle on said cover with a part thereof accessible outwardly of said compartment and for movement relatively to said cover and also bodily with said cover when said cover is removed from covering position relatively to said compartment, a rod extending outwardly of said compartment between said handle and said control member whereby movement of said handle imparts movement to said control member, and means whereby said rod is readily releasable from connecting relation between said control member and handle whereby said handle moves with said cover freely of said control member when said cover is pivoted out of covering position.

4. In a truck of the class described, a forward battery containing compartment, a cover for said battery containing compartment movable into and out of covering position, a control member for a part of said truck positioned rearwardly of said battery containing compartment, a manually operated handle, means mounting said handle on said cover for movement relatively to said cover and for movement bodily with said cover when said cover is removed from covering position relatively to said compartment, means of connection extending between said handle and said control member whereby movement of said handle imparts movement to said control member, including yielding means holding said means of connection assembled between said handle and member, said yielding means yielding to release said connecting means from connecting relation to said handle and control member when said cover is moved out of covering position.

5. In a truck of the class described, a forward battery containing compartment, a cover for said battery containing compartment pivoted on said compartment for movement into and out of covering position, a control member for a part of said truck positioned in longitudinally displaced relation to said cover, a manually operated handle, means mounting said handle on said cover for movement relatively to said cover and for movement bodily with said cover when said cover is removed from covering position relatively to said compartment, and a longitudinally extending means of connection between said handle and said control member whereby movement of said handle relatively to said cover when said cover is in closed position imparts movement to said control member, including yielding means holding said means of connection assembled between said handle and member, said yielding means yielding to release said connecting means from connecting relation to said handle and control member when said cover is moved out of covering position.

6. In a truck of the class described, a forward battery containing compartment, a cover for said battery containing compartment pivoted on said compartment for movement into and out of covering position, a control member for a part of said truck positioned in longitudinally displaced relation to said cover, a manually operated handle, means mounting said handle on said cover for movement relatively to said cover and for movement bodily with said cover when said cover is removed from covering position relatively to said compartment, a rod, extending longitudinally between said handle and said control member whereby movement of said handle imparts movement to said control member, yielding means holding said rod assembled between said handle and member, said yielding means yielding automatically to release said rod from connecting relation to said handle and control member when said cover is pivoted out of covering position.

7. In a truck of the class described, a forward battery containing compartment, a cover for said battery containing compartment pivoted on said compartment for movement into and out of covering position, a control member for a part of said truck positioned in longitudinally displaced relation to said cover, a manually operated handle, means mounting said handle on said cover for movement relatively to said cover and for movement bodily with said cover when said cover is pivoted from covering position relatively to said compartment, a part of said handle lying outwardly of said cover, a rod extending between said handle and said control member whereby movement of said handle imparts movement to said control member, yielding means holding said rod connected to said handle and control member, said yielding means yielding automatically to release said rod from connecting relation to said handle and control member when said cover is pivoted out of covering position.

CHARLES S. SCHROEDER.

REFERENCES CITED

The following references are of record in the file of this patent:

UNITED STATES PATENTS

| Number | Name | Date |
| --- | --- | --- |
| 1,235,907 | Lippmann | Aug. 7, 1917 |
| 2,260,025 | Hepperlen | Oct. 21, 1941 |
| 2,284,237 | Stevenson | May 26, 1942 |
| 2,395,345 | Schreck | Feb. 19, 1946 |
| 2,507,357 | Stoner | May 9, 1950 |